Patented May 28, 1940

2,202,160

UNITED STATES PATENT OFFICE 2,202,160

PLASTIC COMPOSITION FOR USE IN INTERLAYER SHEETS

Barnard M. Marks, Upper Montclair, N. J., assignor to E. I. du Pont de Nemours & Company, Wilmington, Del., a corporation of Delaware No Drawing. Application July 13, 1939, Serial No. 284,204

9 Claims. (Cl. 49—92)

This invention relates to plastic compositions and, more particularly, to a new plastic composition adapted for use in laminated articles, especially laminated glass.

Laminated safety glass is made up ordinarily of two sheets of glass and an intermediate or interlayer sheet of plastic material, the three being bonded together with or without the use of an auxiliary adhesive. Similar in construction are light-polarizing panes made up of a polarizing layer of plastic and one or more layers of glass. Analogous, also, are other structures in which interlayers of plastics are used to bond together, or to provide surface protection for, layers of metal, paper, cloth, wood, and the like.

While the present invention is primarily directed to improvement in the quality of safety glass, it is obvious that in so far as the requirements of other analogous uses are met by the invention it will be properly applicable to them also.

The requirements of a plastic composition for use in the interlayer sheet of laminated safety glass are well recognized. Chief among them are transparency, approximate freedom from color, toughness at all temperatures of service, form-stability at all temperatures of service, the ability to be bonded to glass, either with or without the use of an auxiliary adhesive, resistance to moisture, or, at least, failure to be damaged by moisture, permanence of all properties of the interlayer, and of its bond with the glass, during aging or during prolonged exposure to service conditions, including moisture, light and heat, continuously or intermittently applied.

The polyvinyl acetal resins are, as a class, satisfactory base materials for the formulation of interlayer sheeting, but specific differences in suitability within the class have been recognized. For use in safety glass interlayer sheets the resin must be modified with a plasticizer, primarily for the purpose of enhancing its toughness, particularly at low temperatures. The selection and proportioning of plasticizer are recognized as of importance second only to the selection of the resin itself.

An object of the present invention is to provide a new plastic composition. A further object is to provide a plastic interlayer sheet possessing in high degree the combination of requisite and desirable properties set forth above. A further object is to provide an improved laminated glass. More specifically, it is an object of the invention to provide a plasticizer particularly well adapted to be compounded with certain polyvinyl acetal resins for the manufacture of interlayer sheeting. Other objects will be apparent from the description of the invention given hereinafter.

The above objects are accomplished according to the present invention by preparing a plastic composition comprising a polyvinyl acetal resin of specific type with a specific plasticizer in a definite proportion range and the use of this composition as the interlayer sheet in laminated articles. All proportions given throughout the specification and claims are by weight unless otherwise stated.

The resin employed in the present invention is one derived from polyvinyl acetate by the steps of hydrolysis and condensation with normal butyraldehyde and containing polyvinyl acetate, 0 to 2%, polyvinyl alcohol, 17.5 to 22%, (preferably 18.5 to 20%), and polyvinyl butyral, balance. The plasticizer is triethylene glycol dipelargonate and is used in proportions between about 43 and 51.5 parts per 100 parts of resin (i. e., between 30 and 34% of the total of resin and plasticizer), and, preferably, between about 45 and 48 parts (31 and 32.5%).

Triethylene glycol dipelargonate may be prepared by direct esterification of triethylene glycol and pelargonic acid with the assistance of a catalyst. Preferably the reaction is conducted in a solvent vehicle in order to reduce the temperature of the reaction and thereby to improve the color of the ester. Triethylene glycol dipelargonate is readily refined by distillation in vacuo (B. P. approximately 211° C. at 5 mm. of mercury) to a degree of purity such that it is substantially colorless and contributes to the interlayer composition neither initial color nor appreciable tendency to be discolored by exposure to light and heat in service.

It has been found that the presence of related acids, in small quantities, in pelargonic acid used in the preparation of the ester, and the resulting minor contamination of the triethylene glycol dipelargonate with esters of these acids, will not noticeably alter the results. Accordingly, "triethylene glycol dipelargonate" is to be interpreted for purposes of the present specification as including not only the pure ester but also that made from pelargonic acid of commercial purity without complete removal, thereafter, of related esters.

For use in safety glass, which is the primary, although not the only, purpose to which interlayers according to the present invention may be applied, a suitably selected polyvinyl acetal resin is plasticized to a degree which yields the best combination of mechanical properties over the entire range of temperatures of service. In actual practice the problem involved in selecting the optimum proportion of plasticizer is that of minimizing the reduction of toughness by low temperatures while at the same time avoiding the development of objectionable softness at high temperatures of service.

Chosen on this basis, the operative proportions of a plasticizer to be used with a polyvinyl acetal resin of within a given range of constitution will cover a rather well-defined narrow range. With any individual resin within the range of constitution a specific and generally narrower range of proportions will give optimum results.

In the following examples no specific descriptions are given of the methods by which the ingredients are compounded together and formed into sheeting; any of the methods known to the art is suitable and satisfactory, and the invention is independent of the method by which the interlayer sheeting is prepared. The examples show only resin and plasticizer. To these there may be added coloring ingredients, in manner known to the art, and with the resin and plasticizer there may be associated such small proportions of volatile solvents as may normally remain present in sheeting prepared by commercial processes involving the use of such solvents.

Interlayer sheets made in accordance with the invention are made up into laminated safety glass panes and other laminated articles by methods familiar to those skilled in the arts involved. Specifically, as regards the ordinary safety glass panes, interlayer sheets of compositions within the scope of the invention may be bonded satisfactorily to glass without the use of an auxiliary adhesive, simply by the application of suitable pressure (e. g., from 180 to 200 pounds per square inch in an autoclave) and suitable temperatures (e. g., from 100° C. to 135° C.) in conformity with the ordinary practice in the art.

The following examples are given to illustrate specific embodiments of the invention:

*Example I*

| | Parts |
|---|---|
| Polyvinyl butyral resin | 100 |
| Of constitution— | |
|     Polyvinyl acetate, 0.9% | |
|     Polyvinyl alcohol, 19.5% | |
|     Polyvinyl butyral, balance | |
| Triethylene glycol dipelargonate | 48 |

*Example II*

| | Parts |
|---|---|
| Polyvinyl butyral resin | 100 |
| Of constitution— | |
|     Polyvinyl acetate, 1.7% | |
|     Polyvinyl alcohol, 17.6% | |
|     Polyvinyl butyral, balance | |
| Triethylene glycol dipelargonate | 43 |

*Example III*

| | Parts |
|---|---|
| Polyvinyl butyral resin | 100 |
| Of constitution— | |
|     Polyvinyl acetate, 0.8% | |
|     Polyvinyl alcohol, 21.7% | |
|     Polyvinyl butyral, balance | |
| Triethylene glycol dipelargonate | 51 |

*Example IV*

| | Parts |
|---|---|
| Polyvinyl butyral resin | 100 |
| Of constitution— | |
|     Polyvinyl acetate, 1.4% | |
|     Polyvinyl alcohol, 19.7% | |
|     Polyvinyl butyral, balance | |
| Triethylene glycol dipelargonate | 46 |

*Example V*

| | Parts |
|---|---|
| Polyvinyl butyral resin | 100 |
| Of constitution— | |
|     Polyvinyl acetate, 1.2% | |
|     Polyvinyl alcohol, 18.6% | |
|     Polyvinyl butyral, balance | |
| Triethylene glycol dipelargonate | 47 |

The inherent character of the resins contemplated for use in the present invention and the plasticizing properties of the triethylene glycol dipelargonate are such that laminated glass panes made in accordance with the invention, and comprising interlayers of the selected polyvinyl butyral resins with this plasticizer in preferred proportions, give excellent results in break tests not only at normal temperature but also at winter and summer temperatures, as exemplified by the results obtained with the interlayer sheets made of the plastic composition given in Example I.

The interlayer sheet was bonded between two sheets of glass by the application of heat and pressure, without the use of an auxiliary adhesive. The thickness of the interlayer sheet was 0.015 inch, the thickness of each glass sheet approximately 0.125 inch, and the area a square of 12 by 12 inches. Upon laminated panes of this description, supported peripherally upon a rigid frame, and maintained at several test temperatures, were dropped steel balls of 2 pounds and 0.5 pound weights. The figures tabulated below show the heights from which these balls had to be dropped in order to break through the composite panes:

At 50° C.: 2 lb. ball 5 feet; 0.5 lb. ball 14.5 feet.
At 21° C.: 2 lb. ball 6 feet; 0.5 lb. ball 30 feet.*
At −18° C.: 2 lb. ball 2 feet; 0.5 lb. ball 19 feet.

*Highest drop possible with equipment.

Exposure of the interlayer sheeting or of the laminated glass panes made in accordance with this invention to natural or artificially produced actinic rays has shown the plasticizer to be unobjectionable from the standpoint of resistance to light. Further, interlayer sheets made according to the present invention are free from any tendency toward exudation of plasticizer.

Laminated glass panes containing interlayers of thickness 0.015 inch made in accordance with the present invention, have been subjected to a "boil test," i. e., have been left immersed in boiling water for eight hours and then examined for defects. Panes thus treated have been found free from discoloration, free from bubbles, and free from evidence of either shrinkage or expansion of the interlayer, nor have "letgoes" developed between the glass and the interlayer. A slight blushing developed in the interlayer along its edges, in direct contact with the boiling water, is not sufficient to indicate that any deficiency in moisture-resistance would be evident under conditions of actual service.

Laminated glass panes made in accordance with the invention have been subjected also to an oven test, comprising exposure to a temperature of 125° C. for 4 hours, the test being designed to indicate the quality of resistance to deterioration by prolonged exposure to summer temperatures in actual service. The herein considered interlayers have passed this test with entire satisfaction, having developed no bubbles and no undue discoloration, i. e., no discoloration beyond the irreducible minimum associated with the resins themselves.

The composition of the present invention is adapted for use in interlayer sheets not only for laminated glass but in laminated articles generally wherein one or more sheets of material are bonded to a plastic interlayer sheet. Such articles include laminations of sheets of metal, paper, cloth, wood, and the like, with an interlayer sheet of the plastic composition of the present invention as well as sheets of light-polarizing panes laminated with one or more layers of glass.

While the advantages of the present invention have been pointed out specifically with respect to the use of the present invention in laminated glass, it will be apparent to those skilled in the art that many of the advantages of the present interlayer sheets for use in laminated glass are likewise advantageous in laminated articles generally.

As many apparently widely different embodiments of this invention may be made without departing from the spirit and scope thereof, it is to be understood that the invention is not limited to the specific embodiments thereof except as defined in the appended claims.

I claim:

1. A plastic composition comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 43–51 parts of triethylene glycol dipelargonate.

2. A plastic composition comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 45–48 parts of triethylene glycol dipelargonate.

3. A plastic composition comprising 100 parts of a polyvinyl butyral resin of the following analysis:

Polyvinyl acetate _____ per cent__ 0–2.0
Polyvinyl alcohol _____ do____ 18.5–20.0
Polyvinyl butyral _____ Balance and, as a plasticizer therefor, 45–48 parts of triethylene glycol dipelargonate.

4. A plastic interlayer sheet for use in laminated articles comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 43–51 parts of triethylene glycol dipelargonate.

5. A plastic interlayer sheet for use in laminated articles comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 45–48 parts of triethylene glycol dipelargonate.

6. A plastic interlayer sheet for use in laminated articles comprising 100 parts of a polyvinyl butyral resin of the following analysis:

Polyvinyl acetate _____ per cent__ 0–2.0
Polyvinyl alcohol _____ do____ 18.5–20.0
Polyvinyl butyral _____ Balance and, as a plasticizer therefor, 45–48 parts of triethylene glycol dipelargonate.

7. Laminated glass comprising a sheet of glass and, bonded thereto, an interlayer sheet comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 43–51 parts of triethylene glycol dipelargonate.

8. Laminated glass comprising a sheet of glass and, bonded thereto, an interlayer sheet comprising 100 parts of a polyvinyl butyral resin of the following analysis:

Polyvinyl acetate _____ per cent__ 0–2.0
Polyvinyl alcohol _____ do____ 17.5–22.0
Polyvinyl butyral _____ Balance and, as a plasticizer therefor, 45–48 parts of triethylene glycol dipelargonate.

9. Laminated glass comprising a sheet of glass and, bonded thereto, an interlayer sheet comprising 100 parts of a polyvinyl butyral resin of the following analysis:

Polyvinyl acetate _____ per cent__ 0–2.0
Polyvinyl alcohol _____ do____ 18.5–20.0
Polyvinyl butyral _____ Balance and, as a plasticizer therefor, 45–48 parts of triethylene glycol dipelargonate.

BARNARD M. MARKS.